United States Patent
Endle et al.

(10) Patent No.: US 9,382,428 B2
(45) Date of Patent: Jul. 5, 2016

(54) LIQUID TINT MATERIALS AND FILMS MADE THEREFROM

(75) Inventors: Susan M. Endle, New Richmond, WI (US); Corey J. Radloff, St. Paul, MN (US); Jeffrey J. Schwab, Inver Grove Heights, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 858 days.

(21) Appl. No.: 13/532,307

(22) Filed: Jun. 25, 2012

(65) Prior Publication Data

US 2013/0001830 A1 Jan. 3, 2013

Related U.S. Application Data

(60) Provisional application No. 61/501,799, filed on Jun. 28, 2011.

(51) Int. Cl.

| G02B 5/22 | (2006.01) |
|---|---|
| G02B 5/23 | (2006.01) |
| B29C 41/42 | (2006.01) |
| B05D 3/00 | (2006.01) |
| C09B 67/42 | (2006.01) |
| C09D 5/02 | (2006.01) |
| C09D 5/22 | (2006.01) |
| C09K 9/02 | (2006.01) |

(52) U.S. Cl.
CPC ............ *C09B 67/0071* (2013.01); *C09D 5/024* (2013.01); *C09D 5/22* (2013.01); *C09K 9/02* (2013.01)

(58) Field of Classification Search
CPC ...... C09B 67/0071; C09D 5/024; C09D 5/22; C09K 9/02
USPC .................. 264/334; 252/582, 586, 587, 589; 427/372.2
See application file for complete search history.

(56) References Cited

U.S. PATENT DOCUMENTS

| 4,106,154 | A | 8/1978 | Forsberg |
|---|---|---|---|
| 4,196,235 | A | 4/1980 | Lindqvist |
| 4,398,839 | A | 8/1983 | Kluck |
| 4,444,939 | A | 4/1984 | Postle |
| 4,889,413 | A | 12/1989 | Ormsby |
| 5,588,476 | A | 12/1996 | Trethewey |
| 5,606,763 | A | 3/1997 | South |
| 5,829,507 | A | 11/1998 | Pawlowski |
| 5,975,696 | A | 11/1999 | Kohan |
| 6,187,377 | B1 | 2/2001 | Tojo |
| 6,295,689 | B1 | 10/2001 | Sciacca |
| 6,536,828 | B2 | 3/2003 | Love |
| 6,547,469 | B2 | 4/2003 | Vito |
| 6,641,664 | B1 | 11/2003 | Giallourakis |
| 6,709,707 | B2 | 3/2004 | Knobbe |
| 7,263,740 | B2 | 9/2007 | Crisswell |
| 7,300,727 | B2 | 11/2007 | Kazmaier |
| 7,377,710 | B2 | 5/2008 | Baumann |
| 7,493,671 | B2 | 2/2009 | Hurley |
| 7,614,341 | B1 | 11/2009 | Pai |
| 7,662,433 | B2 | 2/2010 | Ford |
| 7,879,936 | B2 | 2/2011 | Woodhall |
| 7,911,676 | B2 | 3/2011 | Knowles |
| 2002/0028288 | A1 | 3/2002 | Rohrbaugh |
| 2004/0063596 | A1 | 4/2004 | Gabric |
| 2004/0180136 | A1 | 9/2004 | Nagase |
| 2005/0104408 | A1 | 5/2005 | Capps |
| 2006/0198952 | A1 | 9/2006 | Nagase |
| 2007/0054216 | A1* | 3/2007 | Habu .................... C09B 47/045 430/270.1 |
| 2007/0207269 | A1 | 9/2007 | Woodhall |
| 2008/0047462 | A1 | 2/2008 | Klein |
| 2008/0187760 | A1 | 8/2008 | Wiand |
| 2010/0227950 | A1* | 9/2010 | Nguyen .................. C08L 25/06 523/400 |
| 2012/0108121 | A1* | 5/2012 | Baran, Jr. ............. C08K 5/0041 442/1 |

FOREIGN PATENT DOCUMENTS

| DE | 19549582 | 11/1998 |
|---|---|---|
| DE | 102006020190 | 11/2007 |
| EP | 2308606 | 4/2011 |
| KR | 20070067812 | 6/2007 |
| KR | 20090067602 | 6/2009 |
| WO | WO 2005/019281 | 3/2005 |
| WO | WO 2007/107531 | 9/2007 |

OTHER PUBLICATIONS

Anderson et al. ("Photochromic mesostructured silica pigments dispersed in latex films", J. Mater. Chem., 2005,15, 3507-3513, The Royal Society of Chemistry).*
PCT International Search Report for PCT/US2012/044303, mailed Oct. 5, 2012.

(Continued)

*Primary Examiner* — Ling Choi
*Assistant Examiner* — Chun-Cheng Wang
(74) *Attorney, Agent, or Firm* — Aleksander Medved

(57) ABSTRACT

Provided are tinted or tintable and clear films formed from liquid tint material, and methods of making and using the same. Such films are useful to application to substrates such as glass, specifically windows on vehicles, to reduce glare from the sun, reject heat, provide protection from UV rays, and create a unique or decorative look to the vehicle. The films dry into a smooth and clear thin film. The film-forming liquid tint materials comprise: an aqueous polymeric dispersion; a tinting agent dispersed in the aqueous polymeric dispersion; wherein upon contact with a substrate, the film-forming liquid tint material dries to a film that is clear and tintable. The tinting agents, in particular, photoactive components, can be encapsulated in a plurality of ORMOSIL nanoparticles.

19 Claims, No Drawings

(56) References Cited

OTHER PUBLICATIONS

Mennig, M. et al., "Development of fast switching photochromic coatings on transparent plastics and glass," *Thin Solid Films*, vol. 351, No. 1-2, pp. 230-234, Aug. 30, 1999.

Scott, Brian J. et al., "Mesoporous and Mesostructured Materials for Optical Applications," *Chem. Mater.* 2001, 13, pp. 3140-3150.

Granqvist, C.G., "Chromogenic materials for transmittance control of large-area windows," Critical Reviews in *Solid State and Materials Sciences*, 16(5), pp. 291-308, 1990.

\* cited by examiner

LIQUID TINT MATERIALS AND FILMS MADE THEREFROM

CROSS-REFERENCE TO RELATED APPLICATION

This application claims priority to U.S. Provisional Patent Application No. 61/501,799, filed Jun. 28, 2011, which is hereby incorporated by reference in its entirety.

TECHNICAL FIELD

This disclosure relates to liquid tint materials and films made therefrom. Liquid materials comprise a tinting agent dispersed in an aqueous polymeric dispersion. The liquid materials are applied to a substrate, such as glass, and dry to form a film. The film is tinted or tintable and clear. The tinting agents can be photoactive components, IR adsorbing components, and/or pigments.

BACKGROUND

Tinting of windows, such as windows of a car or other windowed-vehicle, can provide many benefits including reduction of glare from the sun, rejection of heat, protection from UV rays, and creation of a unique look to a vehicle.

There are two current methods of tinting windows: professional and do-it-yourself (DIY). With professionally-installed tint, typically, the application is semi-permanent, and only a skilled professional can install and remove it. Tinting used by professionals is almost always dark, limiting visibility during the night.

With DIY, typically, tinted film pieces are installed by the consumer. The film pieces can be pre-shaped or cut-to-fit, and the pieces can cover a window in its entirety or just a portion. These films are prone to installation issues (wrinkles, bubbles, unwieldy suction cups). For cut-to-fit films, trimming to the appropriate size can lead to other problems such as damaging the window or its weather-stripping. Moreover, such films are always dark, limiting visibility during the night.

There is a need for materials to tint windows or other surfaces that can be applied by anyone, such that professional skills are not required. There is also a need for films that conform to all shapes and curves during application and that are readily removable.

SUMMARY

Provided are liquid materials that are film-forming such that a film that is formed on a substrate is tinted or tintable and clear. Films disclosed herein are suitable for many types of substrates, glass in particular, and are designed to avoid damage to the substrate or any coatings thereon. In a first aspect, provided are film-forming liquid tint materials comprising: an aqueous polymeric dispersion; a tinting agent dispersed in the aqueous polymeric dispersion; wherein upon contact with a substrate, the film-forming liquid tint material dries to a film that is clear and tintable. Tinting agent is present in an amount that is effective to render the film clear and tintable. The tinting agent can comprise one or more components that are photoactive, IR adsorbing, and/or pigmented.

A photoactive component can comprise a photochromic dye, a fluorescent dye, and/or a chemiluminescent dye. In detailed embodiments, in the presence of UV and/or visible light, the photoactive component imparts a tint and in the absence of UV and/or visible light, the component imparts no tint. The tinting agent can be encapsulated, for example, in a plurality of hybrid organic-inorganic particles, such as ORMOSIL nanoparticles. When a photochromic dye is used, it can be present in an amount in the range of 0.001-5.0 weight % of the film-forming liquid tint material. When a fluorescent dye is used, it can be present in an amount in the range of 0.1-5.0 weight % of the film-forming liquid tint material.

When an IR adsorbing component is used, it can be present in an amount in the range of 0.1-15.0 weight % of the film-forming liquid tint material. When a pigmented component is used, it can be present in an amount in the range of 0.1-1.5 weight % of the film-forming liquid tint material.

In an embodiment, the aqueous polymeric dispersion is part of a formulated system that comprises one or more of: a defoamer, a thickener, and is optionally free of a cross-linking agent. The formulated system can further comprise a slip aid, a dispersing agent, a UV adsorber, a hindered-amine light stabilizer, and/or an antioxidant. One or more embodiments provide that the aqueous polymeric dispersion comprises a polymer comprising styrene, butadiene, acrylic, vinyl acetate, ethylene vinyl acetate, polyurethane, or combinations thereof. In a detailed embodiment, wherein the polymer comprises an aliphatic polyether urethane.

In one or more embodiments, the substrate is nonporous. In a specific embodiment, the substrate is glass.

A detailed aspect provides film-forming liquid tint materials comprising: an aqueous polymeric dispersion; a photoactive component encapsulated in a plurality of ORMOSIL nanoparticles dispersed in the aqueous polymeric dispersion such that the photoactive component imparts a tint in the presence of UV and/or visible light and the photoactive component imparts no tint in the absence of UV and/or visible light; wherein upon contact with a substrate, the film-forming liquid tint material dries to a film that is clear and tintable.

A detailed embodiment provides that the photoactive component encapsulated in a plurality of ORMOSIL nanoparticles is formed by: (a) combining (1) at least one organosilane compound comprising at least two silicon-bonded groups selected from hydroxyl groups, hydrolyzable groups, and combinations thereof and (2) at least one neat photoactive component, to form a ceramic precursor composition; and (b) allowing or inducing hydrolysis of the hydrolyzable groups and condensation of the organosilane compound to form ORMOSIL nanoparticles comprising the photoactive component.

Another aspect provided is a method of providing a clear and tintable film on a substrate using a film-forming liquid tint material, the method comprising: dispersing a tinting agent into an aqueous polymeric dispersion to form the film-forming liquid tint material; applying the film-forming liquid tint material to the substrate; and drying the film-forming liquid tint material to form the tintable and clear film on the substrate. The application step can occur by brushing, rolling, paint pad, doctor blade applicator, spraying, atomization, coating, dipping, or pouring. The methods can further comprise removing the film from the substrate by peeling or wiping. Typically, upon removal of the film from the substrate, substantially no residue remains on the substrate. The methods can also comprise applying the material directly to the substrate that is glass.

Other aspects include a method of providing a clear and tintable film on a substrate using a film-forming liquid tint material, the method comprising: dispersing a photoactive component encapsulated in a plurality of ORMOSIL nanoparticles into an aqueous polymeric dispersion to form the film-forming liquid tint material; applying the film-forming liquid tint material to the substrate; and drying the film-forming liquid tint material to form the tintable and clear film on the substrate.

These and other aspects of the invention are described in the detailed description below. In no event should the above summary be construed as a limitation on the claimed subject matter.

DETAILED DESCRIPTION

Before describing several exemplary embodiments of the invention, it is to be understood that the invention is not limited to the details of construction or process steps set forth in the following description. The invention is capable of other embodiments and of being practiced or being carried out in various ways.

Provided are tinted or tintable and clear films formed from liquid tint material. Such films are useful to application to substrates such as glass, specifically windows on vehicles, to reduce glare from the sun, reject heat, provide protection from UV rays, and create a unique or decorative look for the vehicle. The films dry into a smooth and clear thin film. The choice of aqueous polymeric dispersion is based on desired properties of the resulting film. The choice of tinting agent is based on desired levels of darkness and/or color on the glass. Use of a photoactive component will result in display of a colored state in the presence of UV and/or visible light (sunlight) and in display of the original colorless/clear state in the absence of UV and/or visible light. The films are easily removed by peeling, washing, or wiping the film off of the substrate. The film does not leave a residue and does not harm the application surface. For some embodiments, the film allows an image to be created on a surface that appears in the presence of UV and/or visible light and disappears in the absence of the same. The films can be applied on an interior or an exterior surface of a window.

The following terms shall have, for the purposes of this application, the respective meanings set forth below.

A "tint" or "tinted" refers to not being colorless. A "tinting agent" refers to a component that provides color to the film. "Tintable" means that under certain conditions, a material containing a tinting agent is tinted. For example, film containing a photoactive dye that displays color only in the presence of ultraviolet (UV) and/or visible light is tintable. During the day, such a photoactive dye-containing film is tinted and at night it is colorless.

"Clear" means when looking through the film, there is no noticeable distortion of objects seen through the film.

"Photoactive" means responsive (for example, chemically or electrically) to actinic radiation (for example, some photoactive materials can absorb such radiation and then exhibit fluorescence (fluorescent dyes) or a change in color (photochromic dyes)).

"Actinic radiation" means radiation in any wavelength range of the electromagnetic spectrum (actinic radiation is typically in the ultraviolet wavelength range, in the visible wavelength range, in the infrared wavelength range, or combinations thereof any suitable energy source known in the art can be used to provide the actinic radiation).

"ORMOSIL" means organically-modified silica. Organically-modified silica particles are ones that are engineered to contain both an inorganic silica portion and an organic moiety.

Photoactive Materials

Useful photoactive components include photoactive dyes having at least some organic or organometallic content. The amounts used are effective to render the film clear and tinted or tintable. Useful photoactive dyes include photochromic dyes, fluorescent dyes, chemiluminescent dyes, and the like, and combinations thereof. Such dyes can be synthesized by known methods, and some (for example, fluorescein, Aldrich, St. Louis, Mo.) are commercially available. Preferred photoactive dyes include photochromic dyes, fluorescent dyes, and combinations thereof (more preferably, photochromic dyes and combinations thereof). In one or more embodiments, the photoactive components is a photochromic dye provided in an amount relative to the film-forming liquid tint material in the range of 0.001-5.0% by weight, or 0.01-2.5% by weight, or even 0.05-1.0% by weight. In one or more embodiments, the photoactive components is a fluorescent dye provided in an amount relative to the film-forming liquid tint material in the range of 0.1-5.0% by weight, or 0.25-3.5% by weight, or even 0.05-1.5% by weight.

Representative examples of useful photoactive dyes include fluorescent dyes such as fluorescein and its derivatives, rhodamine and its derivatives, coumarins, benzocoumarins, xanthenes, benzoxanthenes, phenoxazines, benzophenoxazines, napthalimides, naphtholactams, azlactones, methines, oxazines, thiazines, diketopyrrolopyrroles, quinacridones, thio-epindolines, lactamimides, diphenylmaleimides, acetoacetamides, imidazothiazines, benzanthrones, phthalimides, benzotriazoles, pyrimidines, pyrazines, triazines, and the like; chemiluminescent dyes such as peroxidase, luciferase, sulfonamide, 5-amino-2,3-dihydro-1,4-phthalazinedione (known as Luminol), cyalume, oxalyl chloride, tris(bipyridine)ruthenium(II) chloride, pyrogallol, peroxyoxalates, aryl oxylates, acridinium esters, dioxetanes, lucigenin, and the like; photochromic dyes such as spiropyrans, spirooxazines, spirothiopyrans, stilbenes, aromatic azo compounds, chromenes (including napthopyrans), bisimidazoles, spirodihydroindolizines, quinones, perimidinespirocyclohexadienones, viologens, fulgides and fulgimides, diarylethenes, triarylmethanes, anils, and the like (including the photochromic materials described in U.S. Patent Application Publication No. US 2005/0244744 A1 (Kazmaier et al.), the descriptions of which materials are incorporated herein by reference); and the like; and combinations thereof. Preferred photoactive dyes include napthalimides, spiropyrans, spirooxazines, chromenes, and combinations thereof (more preferably, napthalimides, chromenes, and combinations thereof most preferably, chromenes and combinations thereof).

Hybrid Organic-Inorganic Particles

Hybrid organic/inorganic particles are disclosed in U.S. Provisional Patent Application No. 61/501,799, filed Jun. 30, 2011, to which priority is claimed and which is hereby incorporated by reference in its entirety. Such particles, in particular, photoresponsive organically-modified silicate (ORMOSIL) nanoparticles, can fulfill performance requirements of a variety of different applications, while also being able to meet a need for a relatively simple, efficient, and cost-effective process for their preparation. Briefly, in one aspect, this invention provides a process for preparing photoresponsive hybrid organic-inorganic particles. A representative process comprises:

(a) combining (1) at least one organosilane compound comprising at least two silicon-bonded groups selected from hydroxyl groups, hydrolyzable groups, and combinations thereof and (2) at least one neat (that is, not diluted or mixed with organic solvent) photoactive material, to form a ceramic precursor composition; and (b) allowing or inducing hydrolysis of the hydrolyzable groups and condensation of the organosilane compound to form hybrid organic-inorganic particles comprising the photoactive material.

IR Adsorbing Materials

Useful IR adsorbing materials include IR adsorbing component that absorb light having a wavelength in the range of 750-2500 nm. IR adsorbing materials are also capable of absorption of light in the visible spectrum, qualifying them as tinting agents. In one or more embodiments, the IR adsorbing components are provided in an amount relative to the film-forming liquid tint material in the range of 0.1-15.0% by weight, or 0.25-8.0% by weight, or even 0.5-4.0% by weight.

Exemplary IR adsorbing agents include, but are not limited to, organic IR absorber components comprising: phthalocyanines, naphthalocyanines, metal complexes, azo dyes, anthraquinones, quadratic acid derivatives, immonium dyes, perylenes, quarterylenes, polymethines, or combinations thereof; or inorganic IR absorbing components comprising: indium tin oxide, doped indium tin oxide, antimony tin oxide, doped antimony tin oxide, zinc oxide, aluminum oxide, or combinations thereof.

Pigmented Materials

Useful pigmented materials include organic pigment, inorganic pigment, carbon black, spinel pigment, or combinations thereof. In one or more embodiments, the pigmented components are provided in an amount relative to the film-forming liquid tint material in the range of 0.1-1.5% by weight, or 0.15-1.0% by weight, or even 0.15-0.75% by weight.

Polymeric Dispersions and Formulated Systems

Useful polymeric materials include styrene, butadiene, acrylic, vinyl acetate, ethylene vinyl acetate, polyurethane, or combinations thereof. A preferred polymer is an aliphatic polyether urethane provided by Stahl USA under the trade designation "RU 13-825". The aqueous polymeric dispersion can be part of a formulated system that comprises a defoamer and/or a thickener. In particular embodiments, the polymer is non-cross-linked, and the system is free of a cross-linking agent. The formulated system can further comprise a slip aid, a dispersing agent, a UV adsorber, a hindered-amine light stabilizer, and/or an antioxidant as desired to facilitate stability, durability, and/or integrity of the resulting film.

Films

The films themselves can vary in function, but they generally provide a tint to a substrate, for example, a window, while remaining clear to avoid visual distortion when looking through the film. These films are not opaque. The films can vary in thickness and tint strength based on need.

Quality of the films can be measured by clarity, haze, transmission, and average transmission. Clarity is a measurement of how distinctly an object can be seen through the film based on scattering of incident light through the film in a range of angles less than 2.5 degrees from the normal direction. Films formed by the liquid tint materials disclosed herein can have clarifies that are 70% or greater, 80% 90% or greater, 95% or greater, or even 97%, 98%, or 99%, or greater. Haze is also a measurement of how distinctly an object can be seen through the film based on light scattering, but for angles larger than those measured for clarity. Films formed by the liquid tint materials disclosed herein can have haze measurements that are less than 75%, less than 50%, less than 35%, less than 20%, less than 15%, less than 10%, less than 5%, 4%, 3%, 2% or even less than 1%. In one or more embodiments, the clarity is greater than 70% and the haze is less than 75%.

Acceptable transmissions and average transmissions can widely range from 0 to 100%.

Application and Removal of Films to Substrates

The film-forming liquid tint materials disclosed herein are especially suitable for application to substrates that are non-porous. In one or more specific embodiments, the substrates are glass such as windows on a vehicle, a home, a school, a business, or any other suitable location where there is a desire for tint to be applied to the glass. It is also envisioned that the film-forming liquid tint materials can be applied to windows to provide tinted decorative aspects while providing a clear film that can be seen through without distortion.

Application of the film-forming liquid tint material can occur by methods known in the art such as by brushing, rolling, paint pad, doctor blade applicator, spraying, atomization, coating, dipping, or pouring. Devices such as Meyer rods can be used for application. Another suitable device for coating the film-forming liquid tint materials disclosed herein is being concurrently filed under Applicant's designation of Case No. 68296US002, which is incorporated herein by reference.

Film-forming liquid material can be packaged as desired, for example, in bottles, tubes, spray cans or applicators, and the like. To package as a propellant-based aerosol, a compatible propellant would be added to the can or to the film-forming liquid tint material, but upon discharge, the propellant would flash off. Amounts discussed herein relate to weight percent of the film-forming liquid tint material to the exclusion of any propellants that may be present in the packaging.

As for removing the films that form upon drying of the film-forming liquid tint materials, this can easily be done by peeling or wiping. In some cases, a cleaner such as a glass cleaner may be needed to wipe away the film.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the disclosure are approximations, the numerical values set forth in the specific examples are reported as precisely as possible. Any numerical value, however, inherently contain certain errors necessarily resulting from the standard deviation found in their respective testing measurements.

EXAMPLES

Unless otherwise noted, all parts, percentages, ratios, etc. in the examples and the rest of the specification are by weight, and all reagents used in the examples were obtained, or are available, from general chemical suppliers such as, for example, Sigma-Aldrich Company, Saint Louis, Mo., or may be synthesized by conventional methods.

The following abbreviations are used to describe the examples:
° C.: degrees Centigrade
cps: centipoise
° F.: degrees Fahrenheit
IR: infrared mil: $10^{-3}$ inches mL: milliliter μm: micrometers nm: nanometers oz: ounce Pa·s: Pascal·second UV: ultraviolet A-34: A defoamer, obtained under the trade designation "FOAMSTAR A-34" from BASF Corporation, Florham Park, N.J.

A1230: Polyethelenoxy-silane, obtained under the trade designation "SILQUEST A1230" from Momentive Performance Materials, Wilton, Conn.

BTC: Benzethonium chloride.

CX-Z641M: A 60% by weight infrared absorbing nanoparticle dispersion, obtained under the trade designation "CELNAX CX-Z641M" from Nissan Chemical America Corporation, Houston, Tex.

DF-1760: A defoamer, obtained under the trade designation "DAPRO DF-1760" from Elementis Specialties, Inc., Hightstown, N.J.

DGSY: A 50% by weight fluorescent pigment dispersion, obtained under the trade designation "DAY-GLO FLUORESCENT WATER DISPERSION SATURN YELLOW" from Day-Glo Color Corp., Cleveland, Ohio.

DS-10: Sodium dodecylbenzene sulfonate.

HJB: An aqueous black pigment paste, obtained under the trade designation "HI-JET BLACK30B465" from Penn Color, Inc., Doylestown, Pa.

M-600: A polyetheramine, obtained under the trade designation "JEFFAMINE M-600" from Huntsman Chemical Corporation, The Woodlands, Tex.

NMP: N-Methyl-2-pyrrolidone.

PPES: Polypropylenoxysilane, prepared as follows: 50 grams M-600 was added to a glass jar with a stir bar. 19.6 grams triethoxysilylpropane isocyanate was added dropwise to the Jeffamine and stirred for 2 hours at 21° C. The reaction product, PPES, was used without purification.

PSSA: Poly(styrenesulfonic acid-co-maliec acid).

PTMS: Phenyltrimethoxysilane.

RM-8W: A non-ionic rheology modifier, obtained under the trade designation "ACRYSOL RM-8W" from Dow Chemical Company, Midland, Mich.

RM-12W: A non-ionic rheology modifier, obtained under the trade designation "ACRYSOL RM-12W" from Dow Chemical Company.

RSP: A photochromic dye, obtained under the trade designation "REVERSACOL STORM PURPLE" from Vivimed Labs Ltd., Hyderabad, India.

RU 13-825: A polyurethane, obtained under the trade designation "RU 13-825" from Stahl USA, Inc., Peabody, Mass.

EPCD1: An encapsulated photochromic dye, prepared as follows. To a 1000 mL round bottom flask fitted with a stirrer was added 437.5 mL of 6 milli-Molar sodium hydroxide solution, 35 grams BTC, and the mixture stirred at 21° C. until the BTC was dissolved. 35 grams of a dye-silane solution containing 0.33% by weight RSP, 33% by weight PTMS, and 66.67% by weight A1230 was then added using a VWR model variable flow mini-pump at a rate of 0.1 mL/minute. The stirring continued for at least two hours after complete addition of the dye-silane solution. 437.5 mL ethyl acetate was then added and the contents transferred to a large separating funnel. The organic layer, 8.2 weight % ECDP1, was then collected in a round bottom flask.

EPCD2: An encapsulated photochromic dye was prepared as generally described in ECDP1, wherein the A1230 was replaced by an equal weight of PPES.

EPCD3: An encapsulated photochromic dye, prepared as follows. 178 grams of a 30 milli-Molar sodium hydroxide solution was added to a 16 oz. (473 mL) glass bottle, followed by 11 grams DS-10, and the mixture stirred at 21° C. until the DS-10 was dissolved. While continuing to stir, 11 grams of a 1% by weight RSP in PTMS dye-silane solution was added using the VWR model variable flow mini-pump at a rate of 0.1 mL/minute. Stirring was continued for at least 2 hours at 21° C. after complete addition of the RSP-PTMS solution. Average particle size of the resulting particles was determined to be 30.0 nm in diameter. Particle size distribution was measured by Dynamic Light Scattering (DLS) using a model "ZETASIZER-NANOZS™" particle size analyzer, obtained from Malvern Instruments, Malvern, United Kingdom. Sample sols were prepared in water for DLS measurements. A small (0.1-0.5 mL) aliquot was taken from of the sol and diluted with 2 mL of water. The resulting diluted sample was mixed well and then transferred to a plastic cuvette. Light scattering data was recorded with the sample temperature set at 25° C. For transforming autocorrelation function into particle size, standard values for the viscosity ($0.8872 \times 10^{-3}$ Pa·s; 0.8 cps) and refractive index (1.33) of water at 25° C. were used. A value of 1.428 was used as the refractive index for amorphous silica. The reported Z-average diameter (average particle diameter, d, in nm) was based upon an intensity weighted distribution. All results are reported in terms of particle size, d (nm).

Example 1

103.3 grams n-methyl-2-pyrrolidone (NMP) was combined with 393.4 grams of 8.2% by weight EPCD1 in ethyl acetate. The ethyl acetate was removed from the mixture using a rotary evaporator, resulting in a 34% by weight sol of EPCD1 in NMP. 5 grams each of RU 13-825 and EPCD1-NMP were then added and mixed at 2,500 rpm using a vortex mixer, model "MV1 MINI VORTEXER" obtained from IKA Works, Inc., Wilmington, N.C. Approximately 1-2 grams of the mixture was placed on a 5 by 7.5 cm by 1 mm clean glass slide and manually coated using a #60 Meyer Rod, then dried at 21° C. The resulting colorless clear film was visually free of defects and had an approximately thickness of 2-3 mil (50.8-76.2 nm). The film was observed to change from a colorless to a dark blue-black state when placed under a UV lamp, model "UVGL-25 365 NM" obtained from UVP, LLC, Upland, Calif., at a distance of 2-3 mm for between 30-60 seconds. The film returned to its colorless state once removed from the UV light source. The film was subsequently peeled off the glass substrate without leaving any noticeable residue on the glass.

Example 2

11.2 grams EPCD1 was reduced to 100% solids using a rotary evaporator. 12.5 g of an aqueous polyvinyl alcohol solution, obtained under the trade name "3M BOOTH COATING" from 3M Company, was added to the flask and mixed using the vortex mixer at 2,500 rpm until the EPCD1 was completely dissolved. Approximately 1-2 grams of the sol was coated and dried on a glass substrate as generally described in Example 1. The resulting visually defect-free clear film exhibited similar color, photochromic and peel characteristics as Example 1.

Example 3

7 grams EPCD2 was reduced to 100% solids using a rotary evaporator. 7 grams of an acrylate terpolymer/polysiloxane copolymer in hexamethyldisiloxane, obtained under the trade designation "NEXCARE NO STING LIQUID BANDAGE" from 3M Company, was added to the flask and mixed using the vortex mixer at 2,500 rpm until the EPCD2 was completely dissolved. Approximately 1-2 grams of the sol was coated and dried on a glass substrate as generally described in Example 1. The resulting visually defect-free clear film exhibited similar color, photochromic and peel characteristics as Example 1.

Example 4

3.7 grams RM-12W and 47.8 grams deionized water were added to a 250 mL plastic beaker at 70° F. (21.1° C.) and mixed by means of a metal blade until homogenously dispersed 0.6 grams DF-1760 was added and mixed until dispersed, followed by 47.8 grams RU 13-825, and mixing continued until dispersed. 100 grams of the resulting composition was mixed with an equal weight EPCD3 and transferred to an aerosol canister. 67 grams dimethyl ether was added and the aerosol canister was sealed. The resulting photochromic dispersion was manually sprayed onto a 5 by 7.5 cm glass substrate and allowed to dry at 70° F. (21.1° C.) for approximately 60 minutes. The resulting visually defect-free clear film exhibited similar color, photochromic and peel characteristics as Example 1.

Example 5

3.7 grams RM-12W and 47.6 grams deionized water were added to a 250 mL plastic beaker at 70° F. (21.1° C.) and mixed by means of a metal blade until homogeneously dispersed 0.6 grams DF-1760 was added and mixed until dispersed, followed by 0.50 grams HJB, then 47.6 grams RU 13-825, and mixing continued until dispersed. The dispersion was transferred to an aerosol canister and sealed. 33 grams dimethyl ether was added. The resulting tinted dispersion was manually sprayed onto a glass substrate and allowed to dry at 70° F. (21.1° C.) to an approximately 1 mil (25.4 µm) thickness. The resulting clear black film was visually defect-free. After a period of time, the film was removed from the glass substrate by spraying with commercially available glass cleaner and wiping clean.

Example 6

An aqueous composition was prepared as generally described in Example 5, wherein the 3.7 grams RM-12W was substituted with 2.0 grams RM-8W, and the amount of HJB was reduced from 0.5 to 0.175 grams. Approximately 1-2 grams of the composition was placed on a 5 by 7.5 cm by 1 mm clean glass slide and manually coated using a #50 Meyer Rod, then dried at 21° C. for approximately 60 minutes. The resulting clear visually defect-free film exhibited similar removal characteristics as Example 5.

Comparative A 0.02 grams PSSA and 0.2 grams ethylene glycol were added to 5 grams DGSY in "ST-20" mixing tube at 21° C. and mixed using a model "ULTRA TURRAX TUBE DRIVE" obtained from IKA Works, Inc. 5 grams RU 13-825 were added and mixing continued until homogeneously dispersed. Approximately 1-2 grams of the 24.5% by weight pigmented sol was coated and dried on a glass substrate as generally described in Example 1. The resultant approximately 2-3 mil (50.8-76.2 µm) thick peelable clear film was free of defects and exhibited a bright yellow color that fluoresced under a UV light.

Comparatives B-C and Examples 7a-7b

The process generally described in Comparative A was repeated, wherein the amount of DGSY was reduced, resulting in concentrations of fluorescent pigment in sol corresponding to 12.25, 6.12, 3.06 and 1.22 weight % for Comparatives B, C and Examples 7a and 7b, respectively.

Comparative D

An aqueous composition was prepared and coated as generally described in Example 7, wherein the 5 grams DSGY was substituted with an equal weight of CX-Z641M. The sol contained 30.0% by weight IR absorbing nanoparticles. The resultant approximately 2-3 mil (50.8-76.2 µm) thick peelable clear film was defect-free and exhibited a blue-gray color.

Examples 8a-8d

The process generally described in Comparative D was repeated, wherein the amount of CX-Z641M was reduced, resulting in concentrations of IR absorbing nanoparticles in the sol corresponding to 15.0, 7.5, 3.75 and 1.88 weight % for Examples 8a, 8b, 8c and 8d, respectively.

Clarity and Transmission Measurements.

The following measurements were made on dried film examples on the glass substrate. Results are reported in Table 1.

Average % Transmission.

The Average % Transmission (Ave. % T), was calculated by averaging the % Transmission in 1 nm increments between 400-700 nm. For Examples 1 and 4, samples were illuminated with a "15W CFL PROLUME BLACK LIGHT" obtained from Halco Lighting Technologies, Norcross, Ga., and % transmission measured using a model "JAZ" fiber optic spectrophotometer fitted with a tungsten halogen lamp, obtained from Ocean Optics, Dunedin, Fla. For Examples 5-8, % Transmission was measured using a model "LAMBDA 35 SPECTROPHOTOMETER" obtained from Perkin-Elmer, Inc., Waltham, Mass.

% Transmission, % Haze and % Clarity.

Measured using a "HAZEGARD PLUS" obtained from Byk-Gardner USA, Inc., Columbia, Md.

TABLE 1

| Example | Tinting Agent | | % | | |
| | Type | Amount | Ave. % T | Transmission | % Haze | % Clarity |
| --- | --- | --- | --- | --- | --- | --- |
| 1 | RSP | 0.05 | 78.7 | 91.7 | 7.25 | 97.0 |
| 4 | RSP | 0.021 | 82.4 | 91.2 | 9.06 | 94.2 |
| 5 | HJB | 0.376 | 2.7 | 2.4 | 3.10 | 99.2 |
| 6 | HJB | 0.175 | 55.6 | 61.4 | 3.52 | 94.4 |

TABLE 1-continued

| Example | Tinting Agent | | % | | | |
|---|---|---|---|---|---|---|
| | Type | Amount | Ave. % T | Transmission | % Haze | % Clarity |
| Comparative A | DGSY | 24.5 | 0.3 | 57.9 | 102 | 14.7 |
| Comparative B | DGSY | 12.2 | 1.2 | 85.5 | 100 | 10.5 |
| Comparative C | DGSY | 6.1 | 1.5 | 88.7 | 99.7 | 12.9 |
| 7 a | DGSY | 3.1 | 20.0 | 91.4 | 73.7 | 71.2 |
| 7 b | DGSY | 1.2 | 42.1 | 92.0 | 51.3 | 83.4 |
| Comparative D | CX-Z641M | 30.0 | 2.0 | 12.1 | 85.6 | 74.6 |
| 8 a | CX-Z641M | 15.0 | 9.0 | 28.4 | 76.0 | 90.1 |
| 8 b | CX-Z641M | 7.5 | 43.1 | 59.9 | 18.7 | 95.1 |
| 8 c | CX-Z641M | 3.75 | 71.1 | 79.1 | 5.15 | 97.1 |
| 8 d | CX-Z641M | 1.88 | 82.7 | 87.3 | 3.06 | 97.8 |

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

What is claimed is:

1. A film-forming liquid tint material comprising:
   an aqueous polymeric dispersion, which is part of a formulated system that comprises one or more of: a defoamer, a thickener, and is optionally free of a cross-linking agent;
   a tinting agent dispersed in the aqueous polymeric dispersion, wherein the tinting agent is encapsulated in a plurality of hybrid organic-inorganic particles;
   wherein upon contact with a substrate, the film-forming liquid tint material dries to a film that is tintable.

2. The film-forming liquid tint material of claim 1, wherein the tinting agent is present in an amount that is effective to render the film tintable.

3. The film-forming liquid tint material of claim 1, wherein the tinting agent comprises one or more components that are photoactive, IR adsorbing, and/or pigmented.

4. The film-forming liquid tint material of claim 3, wherein the tinting agent comprises a photoactive component that comprises a photochromic dye, a fluorescent dye, and/or a chemiluminescent dye.

5. The film-forming liquid tint material of claim 4, such that in the presence of UV and/or visible light, the photoactive component imparts a tint and in the absence of UV and/or visible light, the component imparts no tint.

6. The film-forming liquid tint material of claim 1, wherein the hybrid organic-inorganic particles comprise ORMOSIL nanoparticles.

7. The film-forming liquid tint material of claim 1, wherein the formulated system further comprises a slip aid, a dispersing agent, a UV adsorber, a hindered-amine light stabilizer, and/or an antioxidant.

8. The film-forming liquid tint material of claim 1, wherein the aqueous polymeric dispersion comprises a polymer comprising styrene, butadiene, acrylic, vinyl acetate, ethylene vinyl acetate, polyurethane, or combinations thereof.

9. The film-forming liquid tint material of claim 8, wherein the polymer comprises an aliphatic polyether urethane.

10. The film-forming liquid tint material of claim 1, wherein the tinting agent comprises a photoactive component that is a photochromic dye present in an amount in the range of 0.001-5.0 weight % of the film-forming liquid tint material.

11. The film-forming liquid tint material of claim 1, wherein the tinting agent comprises a photoactive component that is a fluorescent dye present in an amount in the range of 0.1-5.0 weight % of the film-forming liquid tint material.

12. The film-forming liquid tint material of claim 1, wherein the tinting agent comprises an IR adsorbing component that is present in an amount in the range of 0.1-15.0 weight % of the film-forming liquid tint material.

13. The film-forming liquid tint material of claim 1, wherein the tinting agent comprises a pigmented component that is present in an amount in the range of 0.1-1.5 weight % of the film-forming liquid tint material.

14. The film-forming liquid tint material of claim 1, wherein the substrate is nonporous.

15. The film-forming liquid tint material of claim 1, wherein the substrate is glass.

16. A film-forming liquid tint material comprising:
   an aqueous polymeric dispersion, which is part of a formulated system that comprises one or more of: a defoamer, a thickener, and is optionally free of a cross-linking agent;
   a photoactive component encapsulated in a plurality of ORMOSIL nanoparticles dispersed in the aqueous polymeric dispersion such that the photoactive component imparts a tint in the presence of UV and/or visible light and the photoactive component imparts no tint in the absence of UV and/or visible light;
   wherein upon contact with a substrate, the film-forming liquid tint material dries to a film that is tintable.

17. The film-forming liquid tint material of claim 16, wherein the photoactive component encapsulated in a plurality of ORMOSIL nanoparticles is formed by:
   (a) combining (1) at least one organosilane compound comprising at least two silicon-bonded groups selected from hydroxyl groups, hydrolyzable groups, and combinations thereof and (2) at least one neat photoactive component, to form a ceramic precursor composition; and (b) allowing or inducing hydrolysis of the hydrolyzable groups and condensation of the organosilane compound to form ORMOSIL nanoparticles comprising the photoactive component.

18. The film-forming liquid tint material of claim 1, wherein the film has a clarity that is greater than 70% and a haze that is less than 75%.

19. The film-forming liquid tint material of claim 16, wherein the film has a clarity that is greater than 70% and a haze that is less than 75%.

* * * * *